(12) United States Patent
Go et al.

(10) Patent No.: US 9,173,275 B2
(45) Date of Patent: Oct. 27, 2015

(54) ALARM CLOCK INTEGRATED WITH LAMP AND METHOD FOR CONTROLLING OPERATION OF LAMP THEREBY

(71) Applicants: Jae-Chun Go, Gyeonggi-do (KR); In Seok Ko, Gyeonggi-do (KR); Hyun Seok Ko, Gyeonggi-do (KR)

(72) Inventors: Jae-Chun Go, Gyeonggi-do (KR); In Seok Ko, Gyeonggi-do (KR); Hyun Seok Ko, Gyeonggi-do (KR)

(*) Notice: Subject to any disclaimer, the term of this patent is extended or adjusted under 35 U.S.C. 154(b) by 0 days.

(21) Appl. No.: 14/430,764

(22) PCT Filed: Sep. 24, 2013

(86) PCT No.: PCT/KR2013/008513
§ 371 (c)(1),
(2) Date: Mar. 24, 2015

(87) PCT Pub. No.: WO2014/051302
PCT Pub. Date: Apr. 3, 2014

(65) Prior Publication Data
US 2015/0230318 A1    Aug. 13, 2015

(30) Foreign Application Priority Data

Sep. 26, 2012   (KR) .................. 10-2012-0107467

(51) Int. Cl.
*G04G 13/02*   (2006.01)
*H05B 37/02*   (2006.01)
*G04C 17/02*   (2006.01)

(52) U.S. Cl.
CPC ............ *H05B 37/0218* (2013.01); *G04G 13/02* (2013.01); *H05B 37/0281* (2013.01); *G04C 17/02* (2013.01)

(58) Field of Classification Search
CPC ..... G04C 17/02; G04C 9/0082; G04C 9/0064; G04C 17/0091; G04G 13/02
USPC ........................................ 368/239, 241, 242
See application file for complete search history.

(56) References Cited

U.S. PATENT DOCUMENTS

| 6,999,383 | B1 * | 2/2006 | Wang et al. ............... 368/228 |
| 7,859,136 | B2 * | 12/2010 | Blair et al. .................. 307/141 |
| 8,259,535 | B2 * | 9/2012 | Sandu et al. .................. 368/10 |
| 8,284,631 | B2 * | 10/2012 | Cho et al. ..................... 368/10 |
| 8,477,568 | B2 * | 7/2013 | Go ............................... 368/256 |

(Continued)

FOREIGN PATENT DOCUMENTS

| JP | 2001-217084 | 8/2001 |
| JP | 2005310438 | 11/2005 |

(Continued)

*Primary Examiner* — Sean Kayes
(74) *Attorney, Agent, or Firm* — IPLA P.A.; James E. Bame

(57) ABSTRACT

Provided is an alarm clock integrated with a lamp and a method for controlling an operation of a lamp by the same, and the alarm clock integrated with the lamp further includes a luminance sensor (181) and a sensor connection unit (182), the microcomputer (120) outputs a sensor operation control signal to a sensor connection unit (182) at a lamp operation time set by a lamp operation time setting unit (111), compares a current luminance value input from a luminance sensor (110) and an initial operation luminance value of a lamp (140) stored therein after a luminance sensor (181) is operated, and outputs a pulse control signal to the lamp current adjustment unit (150) so as to change an output of the lamp (140) so that a luminance value of the lamp (140) is changed to a set luminance value when the initial operation luminance value is smaller than the current luminance value.

4 Claims, 3 Drawing Sheets

(56) References Cited

U.S. PATENT DOCUMENTS

| | | | |
|---|---|---|---|
| 8,867,318 B2* | 10/2014 | Suen | 368/83 |
| 2005/0152223 A1* | 7/2005 | Kawakami | 368/12 |
| 2006/0146652 A1* | 7/2006 | Huizi et al. | 368/107 |
| 2007/0217290 A1* | 9/2007 | Rock | 368/12 |
| 2010/0296370 A1* | 11/2010 | Holmes et al. | 368/73 |
| 2011/0280110 A1* | 11/2011 | Chen | 368/67 |
| 2014/0036642 A1* | 2/2014 | Van De Wouw et al. | 368/68 |
| 2014/0269222 A1* | 9/2014 | Patton et al. | 368/73 |

FOREIGN PATENT DOCUMENTS

| | | |
|---|---|---|
| JP | 2009-110736 | 5/2009 |
| KR | 1020080019419 | 3/2008 |
| KR | 2020100009210 | 9/2010 |

* cited by examiner

ALARM CLOCK INTEGRATED WITH LAMP AND METHOD FOR CONTROLLING OPERATION OF LAMP THEREBY

BACKGROUND

The present invention relates to an alarm clock integrated with a lamp, and particularly, to an alarm clock integrated with a lamp, which changes luminance of the lamp so that an output of the lamp corresponds to current surrounding brightness when a lamp is turned on at a lamp operation time and initial brightness of the lamp is less than surrounding brightness, and a method for controlling an operation of a lamp by the same.

In general, an alarm clock is a clock that helps to wake up a user by issuing an alarm sound signal, such as a sound or a melody, at a specific set time, such as the time at which the sun rises.

Recently, an alarm clock combined with a lamp in which the lamp is attached to the alarm clock has appeared, and the alarm clock combined with the lamp according to the related art performs the operation of issuing an alarm and lighting up the lamp at the same time.

However, since the alarm clock combined with a lamp in the related art is configured to light up the lamp and issue an alarm immediately at the set time, a sleeping person may be startled by the abrupt alarm or may be irritated while he/she is half asleep and half awake, and a sleeping person cannot open his or her eyes due to being dazzled because the lamp is immediately lit up, thereby making rising rather uncomfortable.

A technology developed in order to solve the problem in the related art is "Alarm Clock which operates in conjunction with a Gradually Fading-in Lamp" under Korean Patent Utility No. 20-0457560 (published on Dec. 23, 2011) filed by the applicants of the present inventions.

The alarm clock under Korean Patent Utility No. 20-0457560 relates to the technology in which the lamp gradually turns bright from a set time, such as a sunrise time, and an alarm rings after the lamp is completely turned bright to prevent surprise or irritation due to an abrupt alarm, which controls so that the lamp becomes gradually bright to prevent glare due to sudden turn-on of the lamp, thereby making a user smoothly and naturally wake up while waking up, and contents thereof are described in the publication document, so that a detailed description thereof will be omitted.

However, the alarm clock under Korean Patent Utility No. 20-0457560 has a problem below.

There may be a case where when the lamp is turned on at a lamp operation time, brightness of the lamp during an initial operation is less than surrounding brightness, and when brightness of the lamp during an initial operation is less than surrounding brightness, there is a problem in that even though the lamp is turned on, the lamp is useless (the brightness of the lamp is weak compared to the surrounding brightness, so that even though the lamp 140 is turned on, the lamp 140 cannot exhibit an original function of gradually making a user up), and power is unnecessarily wasted.

Further, when a person finds a switch of an indoor lamp and turns on the indoor lamp after the lamp is turned on, or natural lighting enters and a surrounding area becomes sufficiently bright, the lamp needs to be turned off, but in order to turn off the lamp combined with the alarm clock again, the person needs to walk to a place where the alarm clock is located, and turn off the lamp, which is very troublesome and inconvenient.

SUMMARY OF THE INVENTION

The present invention is made to solve the problem in the related art, and an alarm clock integrated with a lamp and a method for controlling an operation of a lamp by the same according to the present invention have following objects:

First, when a lamp is turned on at a lamp operation time and initial brightness of the lamp is less than surrounding brightness, luminance of the lamp is changed so that an output of the lamp corresponds to the current surrounding brightness, so that it is possible to substantially achieve an original function of a product for gradually waking up a user with brightness of the lamp, and reduce unnecessary power consumption;

second, the luminance sensor is not always operated, but is operated only after the lamp is initially turned on, so that it is possible to improve reliability of an operation of a product; and third, the lamp may be automatically turned off when a surrounding area becomes bright by natural lighting or an indoor light after the lamp is turned on, so that it is possible to solve inconvenience and troublesomeness in that a user needs to move to the alarm clock again and turns off the lamp in order to turn off the lamp of the alarm clock, thereby enabling a user to conveniently use the alarm clock integrated with the lamp.

In order to achieve the above object, the present invention provides an alarm clock integrated with a lamp including a power supply unit, a lamp operation time setting unit for setting an operation time of a lamp, an alarm operation time setting unit for setting an operation time of an alarm module, the lamp for emitting light by using power supplied by a power supply unit, a microcomputer including a timer having a clock function, which is stored in a form of a program, and controlling the alarm module and a time display unit, the time display unit for receiving a time display signal output by the microcomputer, and displaying a current time, the alarm module turned on and off in response to an alarm control signal applied from the microcomputer to output a voice alarm signal, a lamp power supply control unit connected between the power supply unit and the lamp, and switched on and off in response to a lamp drive control signal output by the microcomputer to control power supplied by the power supply unit to the lamp, and a lamp current adjustment unit connected in series to the lamp, and controlling so that an amount of current flowing through the lamp gradually increases based on a pulse width signal output by the microcomputer and controlling the lamp to become gradually bright, the alarm clock integrated with the lamp further including: a luminance sensor for converting the amount of light incident from a surrounding area into an electric signal and outputting the electric signal; and a sensor connection unit connected between the luminance sensor and the microcomputer and controlling an operation of the luminance sensor according to a sensor operation control signal input from the microcomputer, wherein the microcomputer outputs the sensor operation control signal to the sensor connection unit at a lamp operation time set by the lamp operation time setting unit, compares a current luminance value input from the luminance sensor and an initial operation luminance value of the lamp stored therein after the luminance sensor is operated, and outputs a pulse control signal to the lamp current adjustment unit so as to change an output of the lamp so that a luminance value of the lamp is changed to a set luminance value when the initial operation luminance value is smaller than the current luminance value.

The alarm clock integrated with the lamp further includes a luminance value changing and setting unit for changing and setting luminance of the lamp, the microcomputer includes: a luminance value storing unit for storing a changed luminance value input from the luminance value changing and setting unit; a luminance value comparing unit for comparing and determining a current luminance value input from the luminance sensor and an initial operation luminance value; and a lamp output changing unit for generating a lamp output change control signal for changing an output of the lamp so that a luminance value of the lamp is changed to a set luminance value when a determination signal indicating that the initial operation luminance value is smaller than the current luminance value from the luminance value comparing unit.

The alarm clock integrated with the lamp further includes a lamp off reference luminance value input unit for inputting a lamp off reference luminance value for turning off the lamp when surrounding brightness is larger than brightness of the lamp, wherein the microcomputer stores a luminance value input from the lamp off reference luminance value input unit in a luminance value storing unit, and compares a current luminance value input from the luminance sensor and the lamp off reference luminance value stored in the luminance value storing unit, and outputs a lamp off drive control signal to the lamp power supply control unit and turns off the lamp when the current luminance value is equal to or larger than the lamp off reference luminance value.

Further, in order to achieve the above object, the present invention provides a method for controlling an operation of a lamp of an alarm clock integrated with a lamp including a power supply unit, a lamp operation time setting unit for setting an operation time of a lamp, an alarm operation time setting unit for setting an operation time of an alarm module, the lamp for emitting light by using power supplied by a power supply unit, a microcomputer including a timer having a clock function, which is stored in a form of a program, and controlling the alarm module and a time display unit, the time display unit for receiving a time display signal output by the microcomputer, and displaying a current time, the alarm module turned on and off in response to an alarm control signal applied from the microcomputer to output a voice alarm signal, a lamp power supply control unit connected between the power supply unit and the lamp, and switched on and off in response to a lamp drive control signal output by the microcomputer to control power supplied by the power supply unit to the lamp, and a lamp current adjustment unit connected in series to the lamp, and controlling so that an amount of current flowing through the lamp gradually increases based on a pulse width signal output by the microcomputer and controlling the lamp to become gradually bright, the method including: determining whether a time reaches a lamp operation time; outputting a sensor operation control signal to a sensor connection unit when the time reaches the lamp operation time; operating a luminance sensor; comparing a current luminance value input from the luminance sensor and an initial operation luminance value of the lamp, and outputting a pulse control signal for changing an output of the lamp when the initial operation luminance value is smaller than the current luminance value; changing luminance of the lamp; comparing the current luminance value and a lamp off reference luminance value, and outputting a lamp off drive control signal when the current luminance value is equal to or larger than the lamp off reference luminance value after the changing of the luminance of the lamp; and turning off the lamp by the lamp off drive control signal.

The alarm clock integrated with the lamp and the method for controlling an operation of a lamp by the same according to the present invention including the aforementioned configuration have following objects.

First, when a lamp is turned on at a lamp operation time and initial brightness of the lamp is less than surrounding brightness, luminance of the lamp is changed so that an output of the lamp corresponds to the current surrounding brightness, so that it is possible to substantially achieve an original function of a product for gradually waking up a user with brightness of the lamp, and reduce unnecessary power consumption.

Second, the luminance sensor is not always operated, but is operated only after the lamp is initially turned on, so that it is possible to improve reliability of an operation of a product.

Third, the lamp may be automatically turned off when a surrounding area becomes bright by natural lighting or an indoor light after the lamp is turned on, so that it is possible to solve inconvenience and troublesomeness in that a user needs to move to the alarm clock again and turns off the lamp in order to turn off the lamp of the alarm clock, thereby enabling a user to conveniently use the alarm clock integrated with the lamp.

DESCRIPTION OF REFERENCE NUMERALS

Figure 1:
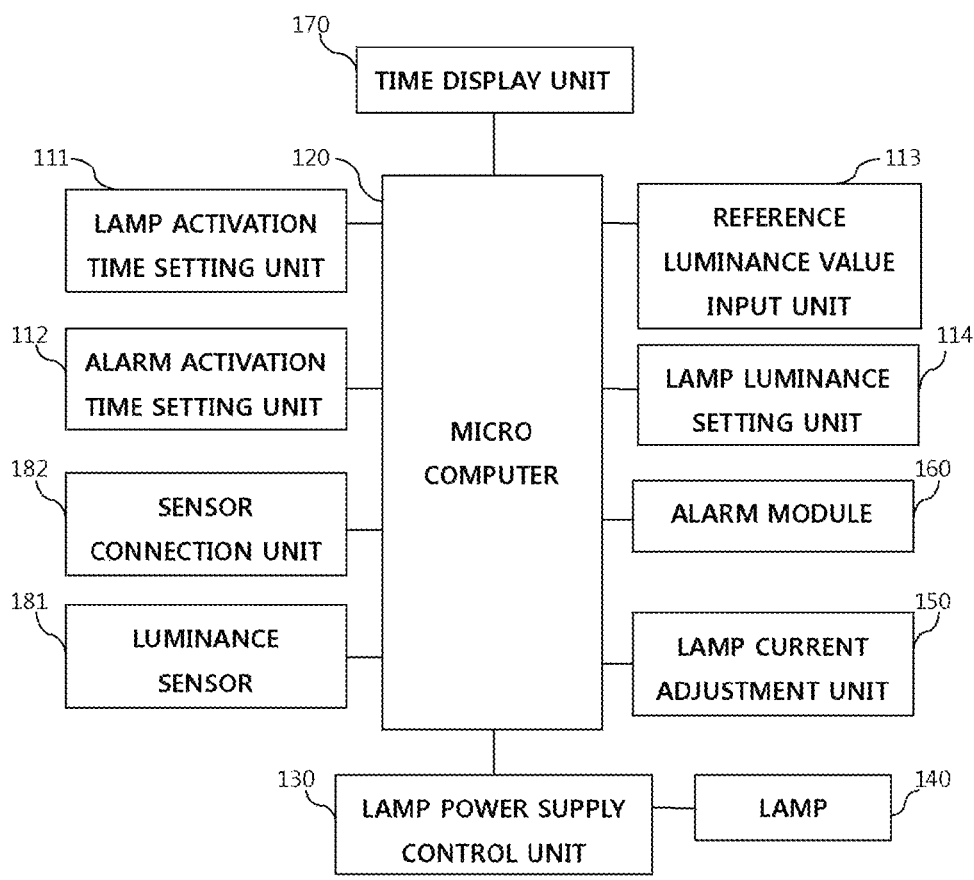
FIG. 1 is a block diagram of an alarm clock integrated with a lamp according to an exemplary embodiment of the present invention.

111: Lamp operation time setting time
112: Alarm operation time setting unit
113: Lamp off reference luminance value input unit
114: Changed luminance value setting unit
120: Microcomputer 121: Luminance value storing unit
122: Luminance value comparing unit
123: Lamp output changing unit
130: Lamp power supply control unit 140: Lamp
150: Lamp current adjusting unit 160: Alarm module
170: Time display unit 181: Luminance sensor
182: Sensor connection unit

DETAILED DESCRIPTION OF THE INVENTION

An exemplary embodiment of an alarm clock integrated with a lamp and a method for controlling an operation of a lamp by the same according to the present invention will be described based on the accompanying drawings.

As illustrated, an alarm clock integrated with a lamp according to an exemplary embodiment of the present invention is an invention based on an alarm clock, which performs an alarm function while being linked with a lamp filed by the applicant of the present invention and registered under Utility Model No. 20-0457560, and includes a power supply unit, a lamp operation time setting unit 111 for setting an operation time of a lamp 140, an alarm operation time setting unit 112 for setting an operation time of an alarm module 160, the lamp 140 for emitting light by using power supplied by a power supply unit, a microcomputer 120 including a timer having a clock function, which is stored in a form of a program, and controlling the alarm module 160 and a time display unit 170, the time display unit 170 for receiving a time display signal output by the microcomputer 120, and displaying a current time, the alarm module 160 turned on and off in response to an alarm control signal applied from the microcomputer 120 to output a voice alarm signal, a lamp power supply control unit 130 connected between the power supply unit and the lamp 140, and selectively switched on and off in response to a lamp drive control signal output by the microcomputer 120 to control the power supplied by the power supply unit to the lamp 140, and a lamp current adjustment unit 150 connected in series to the lamp 140, and controlling so that an amount of current flowing through the lamp 140 gradually increases based on a pulse width signal output by the microcomputer (120), thereby making the lamp 140 gradually becomes bright, and further includes a luminance sensor 181 and a sensor connection unit 182.

The luminance sensor 181 is a configuration for converting the amount of light incident from a surrounding area into an electric signal and outputting the electric signal.

The sensor connection unit 182, which is a configuration connected between the luminance sensor 181 and the microcomputer 120 to connect the power supply unit and the luminance sensor 181, is operated according to a sensor operation control signal input from the microcomputer 120 to control a supply of power of the power supply unit as operation power of the luminance sensor 181.

Further, the microcomputer 120 outputs a lamp-on drive control signal for turning the lamp 140 to the lamp power supply control unit 130 at a lamp operation time set by the lam operation time setting unit 111 and outputs a sensor operation control signal to the sensor connection unit 182 after the lamp 140 is turned on. Accordingly, the luminance sensor 181 is characterized in being operated under a condition that the lamp 140 is operated.

Further, the microcomputer 120 is characterized in that the microcomputer 120 compares a current luminance value input from the luminance sensor 110 and an initial operation luminance value of the lamp 140 stored in the luminance value storing unit 121 therein after the luminance sensor 181 is operated, and when the initial operation luminance value is smaller than the current luminance value (that is, a surrounding brightness value) (when an electric signal value input from the luminance sensor 181 is larger than an initial brightness value of the lamp), the microcomputer 120 outputs a pulse control signal to the lamp current adjustment unit 150 in order to change an output of the lamp 140 so that the a luminance value of the lamp 140 is changed to a set and changed luminance value.

When the lamp 140 is turned on at a lamp operation time and surrounding brightness is higher than brightness of the lamp 140, there is a problem in that the turn-on of the lamp 140 is meaningless (the brightness of the lamp disappears by the brightness of the surrounding area, so that even though the lamp 140 is turned on, there loses an original purpose of gradually waking up a user), and power is wasted, which has been described above, and in order to solve the problem, according to the aforementioned configuration, the luminance sensor 181 is operated at a time at which the lamp 140 is turned on, and when a luminance value at the operation time of the lamp 140 is smaller than a current surrounding luminance value based on the luminance value of the luminance sensor 181, the output of the lamp 140 is changed to have a luminance value equal to or larger than the current luminance value, so that the present invention has an advantage in solving the problem in the related art and performing an original function of the lamp which gradually becomes bright.

Further, in the exemplary embodiment of the present invention, the luminance sensor 181 is not always operated, but is operated only when the lamp 140 is operated, so that a current is not normally supplied to the luminance sensor 181, so that the luminance sensor 181 is not operated, and thus the lamp 140 is not turned on/off according to the luminance sensor 181.

The alarm clock integrated with the lamp according to the exemplary embodiment of the present invention further includes a luminance value changing and setting unit 114 for changing and setting luminance of the lamp 140.

Accordingly, there is an advantage in that a user may set a luminance value of the lamp 140 desired to be changed. A changed luminance set by the changed luminance value setting unit 114 may be set to have, for example, a value equal to a current luminance value, or a value 1.01 times to 1.20 times of a current luminance value.

In the alarm clock integrated with the lamp according to the exemplary embodiment of the present invention, the microcomputer 120 includes a luminance value storing unit 121 for storing a changed luminance value input from the luminance value changing and setting unit 114, a luminance value comparing unit 122 for comparing and determining a current luminance value input from the luminance sensor 181 and an initial operation luminance value, and a lamp output changing unit 123 for generating a lamp output change control signal for changing an output of the lamp 140 so that a luminance value of the lamp 140 is changed to a set luminance value when a determination signal indicating that the initial operation luminance value is smaller than the current luminance value from the luminance value comparing unit 122.

Figure 2:
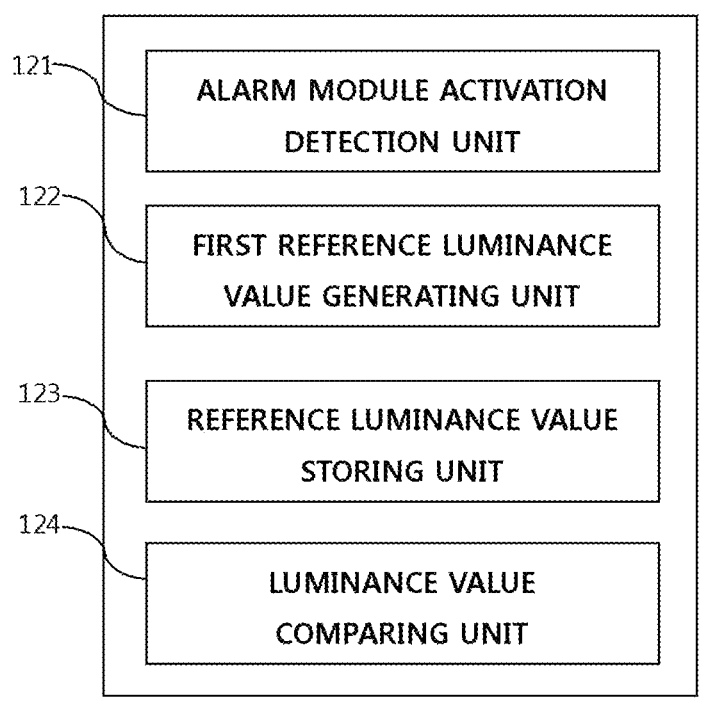
FIG. 2 is a block diagram illustrating a main configuration of a microcomputer 120 of FIG. 1.
Figure 3:
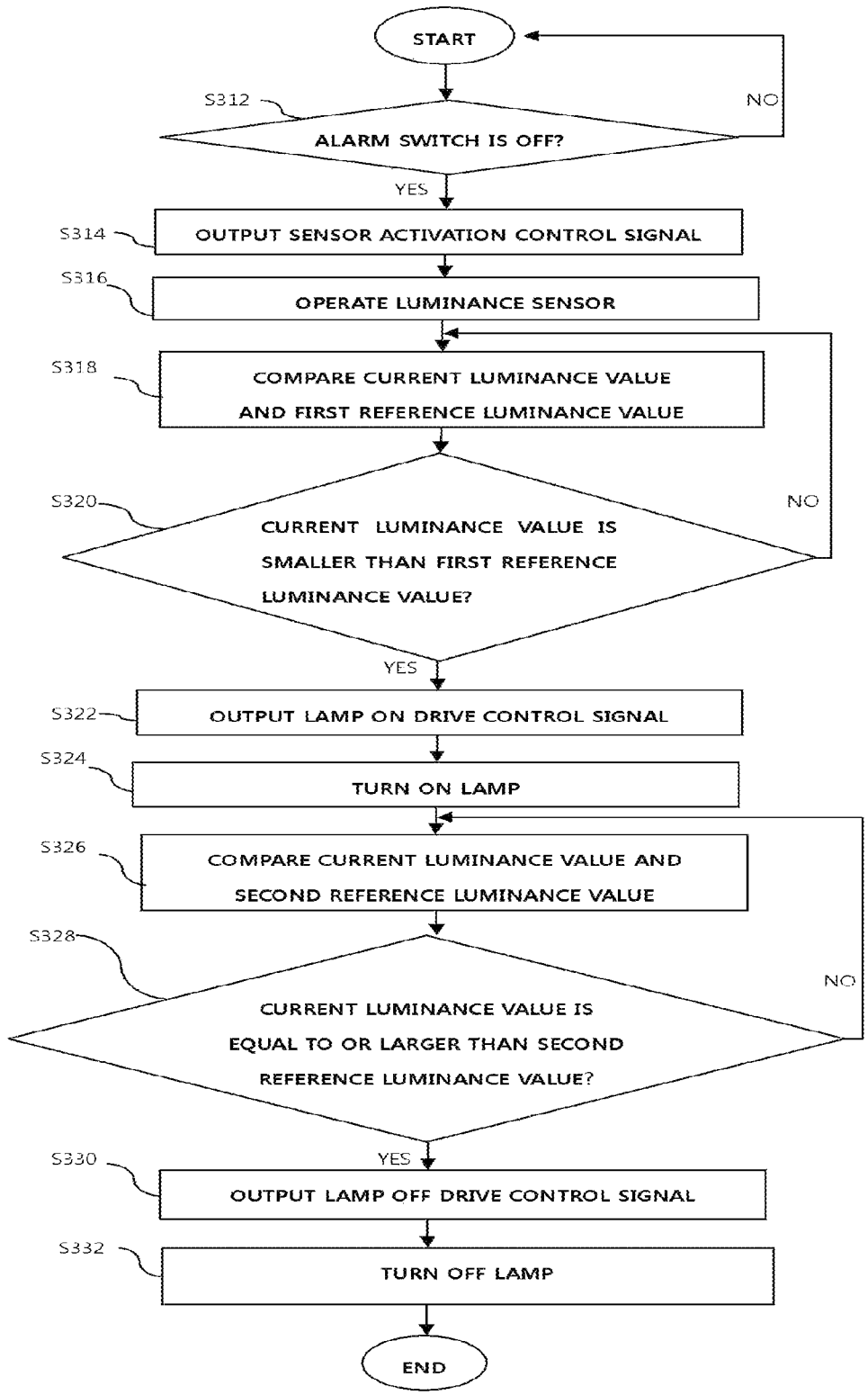
FIG. 3 is a flowchart of a method of switching a lamp by the alarm clock integrated with the lamp according to the exemplary embodiment of the present invention.

The microcomputer 120 does not include only the configuration illustrated in FIG. 2, and further includes a microcomputer controller (not illustrated) for generating a control signal according to an input signal value and outputting the generated control signal, and controlling an entire configuration of the microcomputer 120, a converter (not illustrated) for converting an analog signal into a digital signal or performing an inverse operation, an interface for interfacing input/output of a signal, and the like as a matter of course.

Further, the alarm clock integrated with the lamp according to the exemplary embodiment of the present invention may separately include a lamp luminance value setting unit (not illustrated) for setting an initial operation luminance value that is a luminance value at an initial operation of the lamp set by the lamp operation time setting unit 111 and a final operation luminance value that is a luminance value at a final operation time of the lamp set by the lamp operation time setting unit 111, or an initial operation luminance value and a final operation luminance value may also be set in appropriate to a proper standard of a lamp from a release of a product, not by a user setting method, and both cases belong to the technical scope of the present invention.

The alarm clock integrated with the lamp according to the exemplary embodiment of the present invention further includes a lamp off reference luminance value input unit 113 for inputting a lamp off reference luminance value for turning off the lamp 140 when surrounding brightness is larger than that of the lamp 140.

Further, the microcomputer 120 stores a luminance value input from the lamp off reference luminance value input unit 113 in the luminance value storing unit 121, compares a current luminance value input from the luminance sensor 181 and the lamp off reference luminance value stored in the luminance value storing unit 121, and outputs a lamp off drive control signal to the lamp power supply control unit 130 to turn off the lamp 140 when the current luminance value is equal to or larger than the lamp off reference luminance value.

The lamp off reference luminance value is a luminance value for automatically turning off the lamp 140, for example, when a surrounding area becomes bright by surrounding natural lighting or a user turns on an indoor light after the lamp 140 is first driven.

According to the aforementioned configuration, when the user turns on the indoor light (not illustrated) (or natural lighting becomes bright) after the lamp 140 is turned on, indoor luminance has a value equal to or larger than the lamp off reference luminance value, so that the lamp 140 is automatically turned off.

Accordingly, it is possible to solve inconvenience and troublesomeness that a user needs to move to the alarm clock and turn off the lamp in order to turn off the lamp 140 of the alarm clock again after turning on the indoor light, thereby very conveniently using the alarm clock integrated with the lamp.

In the meantime, in the alarm clock integrated with the lamp according to the exemplary embodiment of the present invention, the microcomputer 120 outputs a lamp drive control signal and a pulse width signal at a lamp operation time set by the lamp operation time setting unit 111, outputs an alarm control signal at an operation time of the alarm module 160 by the alarm operation time setting unit 112, and outputs a time display signal on the time display unit 170, the pulse width signal output by the microcomputer 120 to the lamp current adjustment unit 150 is a pulse width signal, in which a pulse width of a high logic signal, which turns on the lamp 140, gradually increases according to elapse of time, the lamp 140 is formed of, for example, a Light Emitting Diode (LED), and the lamp current adjustment unit 150 includes a buffer amplifier unit for performing a buffer amplifier function on the pulse width signal output by the microcomputer 120, and a Field Effect Transistor (FET) for controlling the amount of current flowing through the lamp 140 in response to the pulse width signal on which the buffer amplifier function has been performed by the buffer amplifier unit, and the configuration is the same as the configuration described in Korean Utility Model No. 20-0457560.

Next, the alarm clock integrated with the lamp according to the exemplary embodiment of the present invention including the aforementioned configuration, and a method for controlling an operation of the lamp by the same will be described.

First, when a surrounding area becomes bright after the lamp is turned on through the lamp off reference luminance value input unit 113, a lamp off reference luminance value for turning off the lamp is input, and a luminance change value is set through the luminance value changing and setting unit 114.

In the meantime, when a lamp operation time is set by the lamp operation time setting unit 111, an operation time of the alarm module 160 is set by the alarm operation time setting unit 112, and a time reaches the lamp operation time by a timer program inside the microcomputer, the microcomputer 160 outputs an alarm control signal to the alarm module 160 to operate the alarm module 160 when the lamp 140 gradually becomes bright and a time reaches the operation time of the alarm module 160, that is, a time at which the lamp 140 completely becomes bright.

The microcomputer 120 determines whether a time is the lamp operation time by driving the timer (S310), and outputs a lamp on drive control signal when the time reaches the lamp operation time (S312).

The microcomputer 120 outputs a sensor operation control signal to the sensor connection unit 182 (S314), and the sensor connection unit 182 is switched based on the sensor operation control signal to apply an operation voltage to the luminance sensor 181, and in this case, power is supplied to the luminance sensor 181, so that the luminance sensor 181 is operated (S316).

The luminance sensor 181 detects surrounding light and transmits a signal level proportional to the amount of light to the microcomputer 120, and the luminance value comparing unit 122 compares a current luminance value input from the luminance sensor 181 and an initial operation luminance value of the lamp 140 (S318), and when the initial operation luminance value is smaller than the current luminance value (S320), the luminance value comparing unit 122 outputs a determination signal indicating that the initial operation luminance value is smaller than the current luminance value, when the lamp output changing unit 123 receives the determination signal indicating that the initial operation luminance value is smaller than the current luminance value from the luminance value comparing unit 122, the lamp output changing unit 123 generates a lamp output change control signal for changing an output of the lamp 140 so that a luminance value of the lamp 140 is changed to the set luminance change value and outputs the generated lamp output change control signal to the lamp current adjustment unit 150 as a pulse control signal (S322).

The lamp current adjustment unit 150 adjusts a current of the lamp 140 based on the pulse control signal, and thus the lamp 140 is changed to have brightness corresponding to the changed luminance value input from the luminance value changing and setting unit 114 (S324).

After changing the luminance of the lamp 140, the current luminance value is compared with a lamp off reference luminance value (S326).

For example, when a user finds an indoor light switch, turns on the indoor light, and the indoor light is turned on, and when indoor brightness is equal to or larger than the lamp off reference luminance value (that is, the current luminance value is equal to or larger than the lamp off reference luminance value) (S328), the microcomputer 120 outputs a lamp off drive control signal (S330).

The lamp power supply control unit 130 receiving the lamp off drive control signal blocks a supply of a current to the lamp 140, and the lamp 140 is turned off (S332).

Accordingly, it is possible to solve troublesomeness in that a user needs to move to the alarm clock in order to turn off an already turned-on lamp 140 after turning on an indoor light, and it is possible to automatically turn off the lamp even though a user does not separately operate a switch of the lamp.

While the preferred exemplary embodiments according to the present invention have been described above, it is obvious to those skilled in the art that in addition to the aforementioned exemplary embodiments, the present invention may be implemented as other specific forms without departing from the purpose and the scope of the present invention.

Accordingly, the aforementioned exemplary embodiments should be only illustrative and not restrictive for this invention, and thus, the present invention is not limited to the aforementioned description, but may be modified within the scope of the appended claims and equivalents thereto.

The invention claimed is:

1. An alarm clock integrated with a lamp comprising a power supply unit, a lamp operation time setting unit (111) for setting an operation time of a lamp (140), an alarm operation time setting unit (112) for setting an operation time of an alarm module (160), the lamp (140) for emitting light by using power supplied by a power supply unit, a microcomputer (120) including a timer having a clock function, which is stored in a form of a program, and controlling the alarm module (160) and a time display unit (170), the time display unit (170) for receiving a time display signal output by the microcomputer (120), and displaying a current time, the alarm module (160) turned on and off in response to an alarm control signal applied from the microcomputer (120) to output a voice alarm signal, a lamp power supply control unit (130) connected between the power supply unit and the lamp (140), and switched on and off in response to a lamp drive control signal output by the microcomputer (120) to control power supplied by the power supply unit to the lamp (140), and a lamp current adjustment unit (150) connected in series to the lamp (140), and controlling so that an amount of current flowing through the lamp (140) gradually increases based on a pulse width signal output by the microcomputer (120) and controlling the lamp (140) to become gradually bright, the alarm clock integrated with the lamp further comprising:

- a luminance sensor (181) for converting the amount of light incident from a surrounding area into an electric signal and outputting the electric signal; and
- a sensor connection unit (182) connected between the luminance sensor (181) and the microcomputer (120) and controlling an operation of the luminance sensor (181) according to a sensor operation control signal input from the microcomputer (120),
- wherein the microcomputer (120) outputs the sensor operation control signal to the sensor connection unit (182) at a lamp operation time set by the lamp operation time setting unit (111), compares a current luminance value input from the luminance sensor (110) and an initial operation luminance value of the lamp (140) stored therein after the luminance sensor (181) is operated, and outputs a pulse control signal to the lamp current adjustment unit (150) so as to change an output of the lamp (140) so that a luminance value of the lamp (140) is changed to a set luminance value when the initial operation luminance value is smaller than the current luminance value.

2. The alarm clock integrated with the lamp of claim 1, further comprising:

- a luminance value changing and setting unit (114) for changing and setting luminance of the lamp (140),
- wherein the microcomputer (120) includes:
- a luminance value storing unit (121) for storing a changed luminance value input from the luminance value changing and setting unit (114);
- a luminance value comparing unit (122) for comparing and determining a current luminance value input from the luminance sensor (181) and an initial operation luminance value; and
- a lamp output changing unit (123) for generating a lamp output change control signal for changing an output of the lamp (140) so that a luminance value of the lamp (140) is changed to a set luminance value when a determination signal indicating that the initial operation luminance value is smaller than the current luminance value from the luminance value comparing unit (122).

3. The alarm clock integrated with the lamp of claim 1, further comprising:

- a lamp off reference luminance value input unit (113) for inputting a lamp off reference luminance value for turning off the lamp (140) when surrounding brightness is larger than brightness of the lamp (140),
- wherein the microcomputer (120) stores a luminance value input from the lamp off reference luminance value input unit (113) in a luminance value storing unit (121), and compares a current luminance value input from the luminance sensor (181) and the lamp off reference luminance value stored in the luminance value storing unit (121), and outputs a lamp off drive control signal to the lamp power supply control unit (130) and turns off the lamp (140) when the current luminance value is equal to or larger than the lamp off reference luminance value.

4. A method for controlling an operation of a lamp of an alarm clock integrated with a lamp comprising a power supply unit, a lamp operation time setting unit (111) for setting an operation time of a lamp (140), an alarm operation time setting unit (112) for setting an operation time of an alarm module (160), the lamp (140) for emitting light by using power supplied by a power supply unit, a microcomputer (120) including a timer having a clock function, which is stored in a form of a program, and controlling the alarm module (160) and a time display unit (170), the time display unit (170) for receiving a time display signal output by the microcomputer (120), and displaying a current time, the alarm module (160) turned on and off in response to an alarm control signal applied from the microcomputer (120) to output a voice alarm signal, a lamp power supply control unit (130) connected between the power supply unit and the lamp (140), and switched on and off in response to a lamp drive control signal output by the microcomputer (120) to control power supplied by the power supply unit to the lamp (140), and a lamp current adjustment unit (150) connected in series to the lamp (140), and controlling so that an amount of current flowing through the lamp (140) gradually increases based on a pulse width signal output by the microcomputer (120) and controlling the lamp (140) to become gradually bright, the method comprising:

- determining whether a time reaches a lamp operation time (S310);
- outputting a sensor operation control signal to a sensor connection unit (182) when the time reaches the lamp operation time (S314);
- operating a luminance sensor (181) (S316);
- comparing a current luminance value input from the luminance sensor (181) and an initial operation luminance value of the lamp (140), and outputting a pulse control signal for changing an output of the lamp when the initial operation luminance value is smaller than the current luminance value (S318, S320, and S322);
- changing luminance of the lamp (140) (S324);
- comparing the current luminance value and a lamp off reference luminance value, and outputting a lamp off drive control signal when the current luminance value is equal to or larger than the lamp off reference luminance value after the changing of the luminance of the lamp (140) (S326, S328, and S330); and
- turning off the lamp (140) by the lamp off drive control signal (S332).

\* \* \* \* \*